US012629800B2

(12) United States Patent
Robinson

(10) Patent No.: US 12,629,800 B2
(45) Date of Patent: May 19, 2026

(54) BENT NOSE PLIERS

(71) Applicant: Douglas Robinson, Royce City, TX (US)

(72) Inventor: Douglas Robinson, Royce City, TX (US)

( * ) Notice: Subject to any disclaimer, the term of this patent is extended or adjusted under 35 U.S.C. 154(b) by 0 days.

(21) Appl. No.: 19/298,869

(22) Filed: Aug. 13, 2025

(65) Prior Publication Data

US 2025/0367791 A1 Dec. 4, 2025

Related U.S. Application Data

(63) Continuation-in-part of application No. 29/939,396, filed on Apr. 26, 2024, and a continuation-in-part of application No. 29/939,406, filed on Apr. 26, 2024.

(51) Int. Cl.

| | |
|---|---|
| ***B25B 7/02*** | (2006.01) |
| ***B25B 7/08*** | (2006.01) |
| ***B25B 7/14*** | (2006.01) |

(52) U.S. Cl.

CPC .................. *B25B 7/02* (2013.01); *B25B 7/08* (2013.01); *B25B 7/14* (2013.01)

(58) Field of Classification Search

CPC .... B25B 7/02; B25B 7/08; B25B 7/14; B25B 7/18

USPC .................................................... 81/316–324

See application file for complete search history.

(56) References Cited

U.S. PATENT DOCUMENTS

| | | | | | |
|---|---|---|---|---|---|
| 241,353 | A | * | 5/1881 | Grein | B25B 7/02 81/332 |
| 1,438,975 | A | * | 12/1922 | Wiggins | A61C 5/85 433/159 |
| 1,792,837 | A | * | 2/1931 | Harrison | B25B 7/02 43/53.5 |
| 4,040,186 | A | * | 8/1977 | Kalvelage | A61C 7/04 433/4 |
| D281,195 | S | | 10/1985 | Kurz | |
| D282,777 | S | * | 2/1986 | Kurz | D24/153 |
| 4,961,742 | A | * | 10/1990 | Torre | A61B 17/062 81/319 |
| D381,569 | S | | 7/1997 | Brantley | |
| D396,619 | S | | 8/1998 | Hunter | |
| D398,499 | S | | 9/1998 | Ronan | |

(Continued)

FOREIGN PATENT DOCUMENTS

| | | |
|---|---|---|
| CN | 301497855 | 3/2011 |

*Primary Examiner* — Hadi Shakeri

(74) *Attorney, Agent, or Firm* — Stephen Y. Liu; M. Conner Hutchisson; Carstens, Allen & Gourley, LLP

(57) ABSTRACT

A gripping tool is provided. The gripping tool includes a first handle extending generally along a first axis when the gripping tool is in a closed configuration, and a first jaw connected to the first handle. A first nose is attached to the end of the jaw and extends in a direction parallel to a second axis. The first nose has an internal cutout. A second handle, rotatably connected to the first handle, connects to a second jaw with a second nose extending along the second axis. The second nose includes a similar internal cutout. A biasing member connected between the first and second handles applies an outward force to place the gripping tool in an open position. When the biasing member is compressed, the gripping tool is in the closed configuration, and the first and second noses engage, creating an opening between the internal cutouts.

20 Claims, 12 Drawing Sheets

(56) References Cited

U.S. PATENT DOCUMENTS

| | | | | |
|---|---|---|---|---|
| D406,031 | S | 2/1999 | Toshima | |
| 6,345,558 | B1 | 2/2002 | Wilson | |
| 6,473,956 | B1 * | 11/2002 | Tucker | B25B 7/02 29/268 |
| 6,860,179 | B2 * | 3/2005 | Hopper | B25B 5/06 81/319 |
| 7,703,748 | B2 * | 4/2010 | Foley | B25B 7/00 254/23 |
| D619,867 | S | 7/2010 | Chiarelli | |
| D625,008 | S | 10/2010 | Boedeker | |
| D654,338 | S | 2/2012 | Sagawa | |
| D657,219 | S | 4/2012 | Kawell et al. | |
| D695,084 | S | 12/2013 | Jensen | |
| 9,636,804 | B2 | 5/2017 | Wu | |
| 9,655,689 | B2 | 5/2017 | Golden | |
| D794,248 | S | 8/2017 | Tokko | |
| D811,841 | S * | 3/2018 | Calfee | D8/52 |
| D817,132 | S | 5/2018 | Yang | |
| D865,468 | S | 11/2019 | Tsai | |
| D887,237 | S | 6/2020 | Huang | |
| D941,104 | S | 1/2022 | Liu | |
| D941,105 | S | 1/2022 | Liu | |
| D948,977 | S | 4/2022 | Cai | |
| 11,345,003 | B1 | 5/2022 | Newkirk et al. | |
| D966,065 | S | 10/2022 | Wu | |
| D1,019,314 | S | 3/2024 | Tsai | |
| 2004/0035255 | A1 | 2/2004 | Rion | |
| 2014/0130641 | A1 | 5/2014 | Chang | |

* cited by examiner

BENT NOSE PLIERS

CROSS-REFERENCE TO RELATED APPLICATIONS

This application is a continuation-in-part application of (1) co-pending U.S. Design application Ser. No. 29/939,396, filed on Apr. 26, 2024, and (2) co-pending U.S. Design application Ser. No. 29/939,406, filed on Apr. 26, 2024, which are incorporated herein by reference in their entirety.

BACKGROUND

Technical Field

The technical field of the present disclosure relates to hand tools and, more particularly, to bent nose pliers.

Description of Related Art

The existing technology related to gripping tools, pliers in particular, often suffers from limitations in flexibility and adaptability for various applications. Many current plier designs do not effectively consider the angles at which jaws are oriented, making them less efficient for intricate tasks. Furthermore, traditional designs frequently lack a robust, user-friendly mechanism for switching between open and closed configurations, which can lead to accidental slips or ineffective gripping. The technology described in this document addresses these issues by introducing innovative features such as angled jaws or noses and enhanced engagement interfaces. These improvements not only increase precision and control during use but also enhance the overall strength and reliability of the gripping tool, making it suitable for a wider range of applications.

BRIEF SUMMARY

This summary provides a discussion of aspects of certain embodiments of the invention. It is not intended to limit the claimed invention or any of the terms in the claims. The summary provides some aspects, but there are aspects and embodiments of the invention that are not discussed here.

In one aspect, a gripping tool is provided. The gripping tool can include a first handle that extends generally along a first axis when the gripping tool is in a closed configuration, and a first jaw connected to the first handle. A first nose can connect to an end of the first jaw such that the first nose extends in a direction parallel to a second axis. The first nose may feature a first cutout formed in its interior portion. The gripping tool can also include a second handle that extends generally along the first axis when the gripping tool is in the closed configuration. The second handle can be rotatably connected to the first handle, enabling the first and second handles to pivot relative to each other. A second jaw can attach to the second handle. A second nose can be connected to an end of the second jaw such that the second nose extends in a direction parallel to the second axis. The second nose can include a second cutout formed in its interior portion. Additionally, the gripping tool can also include a biasing member interconnected between the first and second handles, exerting an outward force on both handles to keep the gripping tool in an open configuration. When the biasing member is compressed, the gripping tool is in the closed configuration, and part of the first nose can engage part of the second nose. The first and second cutouts can form an opening between the first and second noses when the gripping tool is in the closed configuration.

In one embodiment, the first jaw and the second jaw extend along the first axis, and an angle between each of the jaws and their corresponding nose can be between 75° and 105°. In some embodiments, the angle can be about 90°.

In an alternative embodiment, the first jaw and the second jaw extend generally along a third axis. A first angle between each handle and its corresponding nose can be between 75° and 105°, a second angle between each handle and its corresponding jaw can be between 75° and 105°, and a third angle between each nose and its corresponding jaw can be between 75° and 105°. In some embodiments, each angle can be about 90°.

In another embodiment, the first nose can also include a first engagement interface, and the second nose can also include a second engagement interface. The first and second engagement interfaces can be positioned at distal ends of the first and second noses, and the first and second cutouts can be positioned at proximal ends of the first and second noses.

In yet another embodiment, the first handle can have a recess at a distal end, and the second handle can have a clasp at a distal end. The clasp can be configured to engage the recess such that the gripping tool is in the closed configuration.

In another embodiment, the gripping tool can also include a rivet. A first midsection of the first handle can have a first aperture, and a second midsection of the second handle can have a second aperture. The rivet can be secured within the first and second apertures such that the first and second handles rotate about the rivet.

In another embodiment, a first midsection of the first handle can have a rivet extending in a direction generally along the second axis. A second midsection of the second handle can have an aperture, and the rivet can be inserted within the aperture such that the second handle rotates about the rivet.

In another embodiment, the biasing member can be a coil spring, a leaf spring, a torsion spring, a rubber pad, a magnetic biasing member, or any combination thereof.

In another aspect, a gripping tool is provided. The gripping tool can include a first handle extending generally along a first axis when the gripping tool is in a closed configuration, and a first jaw attached to the first handle. The first jaw extends in a direction generally parallel to a second axis. Additionally, the gripping tool can include a first nose connected to an end of the first jaw. The first nose may extend in a direction generally parallel to a third axis and has a first cutout formed in its interior portion of the first nose. The gripping tool can also have a second handle that extends generally along the first axis when the gripping tool is in the closed configuration. The second handle can be rotatably connected to the first handle, allowing the first and second handles to pivot relative to each other. A second jaw can be connected to the second handle, with the second jaw extending in a direction generally parallel to the second axis. A second nose, which extends in a direction generally parallel to the third axis, can be connected to the end of the second jaw and may include a second cutout formed in its interior portion. The first and second handles can be interconnected by a biasing member, which exerts an outward force on the first and second handles to place the gripping tool in an open configuration. When the biasing member is compressed, the gripping tool is in the closed configuration, and a part of the first nose engages a part of the second nose. The first cutout and the second cutout can form an opening between the first nose and the second nose when the gripping tool is in the closed configuration.

In one embodiment, a first angle between each handle and its corresponding jaw can be between 75° and 105°, a second angle between each handle and its corresponding nose can be between 75° and 105°, and a third angle between each jaw and its corresponding nose can be between 75° and 105°. In some embodiments, each angle can be about 90°.

In another embodiment, the first nose can also include a first engagement interface, and the second nose can also include a second engagement interface. The first and second engagement interfaces can be positioned at distal ends of the first and second noses, and the first and second cutouts can be positioned at proximal ends of the first and second noses.

In another embodiment, the first handle can have a recess at a distal end, and the second handle can have a clasp at a distal end. The clasp can be configured to engage the recess such that the gripping tool is in the closed configuration.

In another embodiment, the gripping tool can also include a rivet. A first midsection of the first handle can have a first aperture, and a second midsection of the second handle can have a second aperture. The rivet can be secured within the first and second apertures such that the first and second handles rotate about the rivet.

In yet another embodiment, a first midsection of the first handle can have a rivet extending in a direction generally along the third axis. A second midsection of the second handle can have an aperture, and the rivet can be inserted within the aperture such that the second handle rotates about the rivet.

In still another embodiment, the biasing member can be a coil spring, a leaf spring, a torsion spring, a rubber pad, or a magnetic biasing member.

BRIEF DESCRIPTION OF THE DRAWINGS

The preceding aspects and many of the attendant advantages of the present technology will become more readily appreciated by reference to the following Detailed Description when taken in conjunction with the accompanying simplified drawings of example embodiments. The drawings briefly described below are presented for ease of explanation and do not limit the scope of the claimed subject matter.

DETAILED DESCRIPTION

The technology described herein relates to an innovative design for bent nose pliers (or gripping tools), a commonly used hand tool in various applications. This novel gripping tool addresses several limitations found in traditional plier designs, enhancing both functionality and user experience.

One of the advantages of this technology is the incorporation of angled jaws and noses, which significantly enhances flexibility and adaptability for handling intricate tasks. Many existing pliers do not accommodate the various engagement angles needed for diverse applications, often resulting in inefficient gripping and an increased risk of slippage. Additionally, the disclosed pliers feature improved engagement interfaces and a biasing mechanism for switching between open and closed configurations. Traditional designs often face complications in transitioning modes, leading to potential mishaps during use. Overall, the disclosed technology not only strengthens the reliability and performance of the pliers across a broader range of applications but also emphasizes user safety and comfort.

Figure 1:
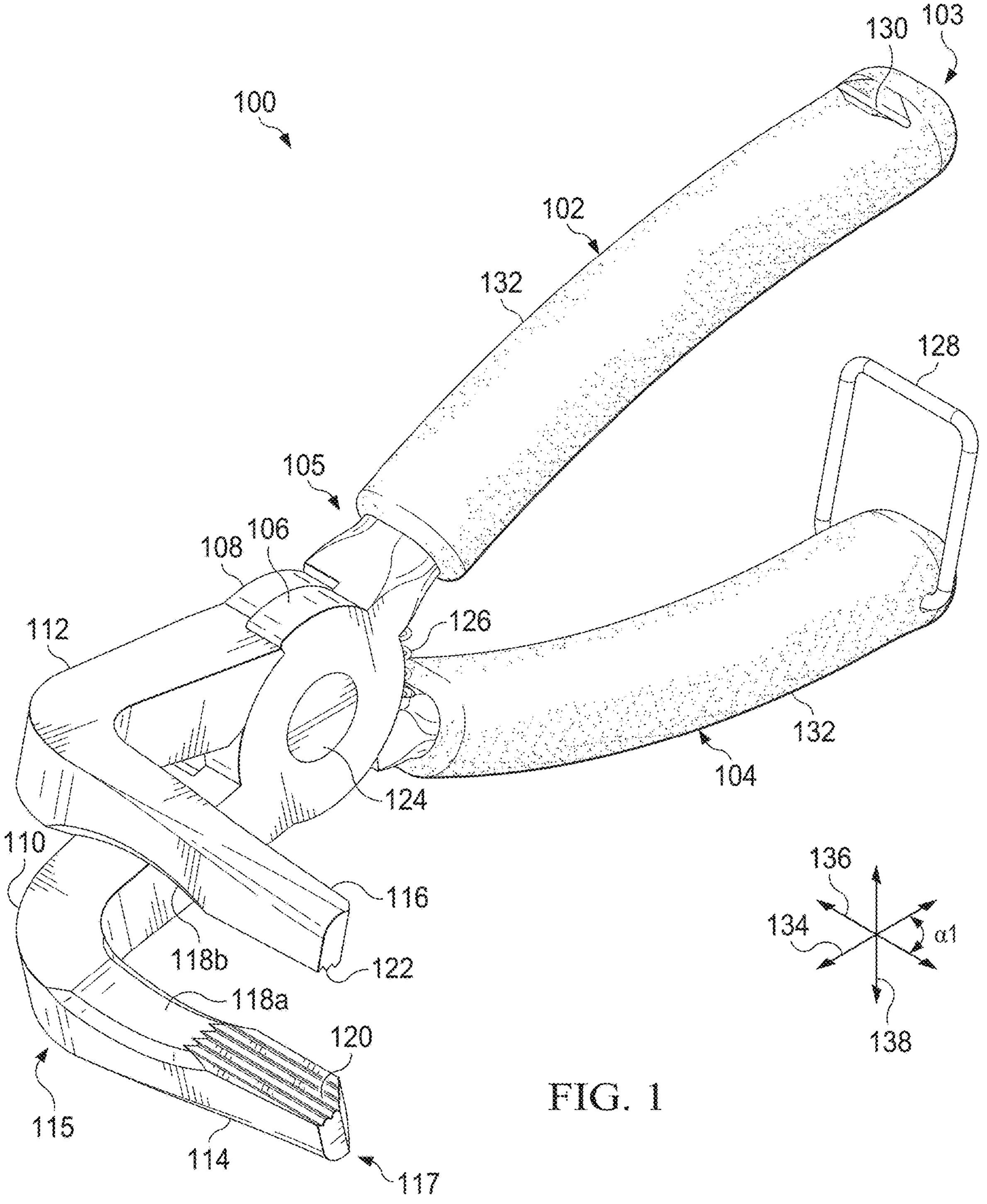
FIG. 1 depicts a front perspective view of a first embodiment of bent nose pliers in accordance with the disclosed principles.
Figure 3:
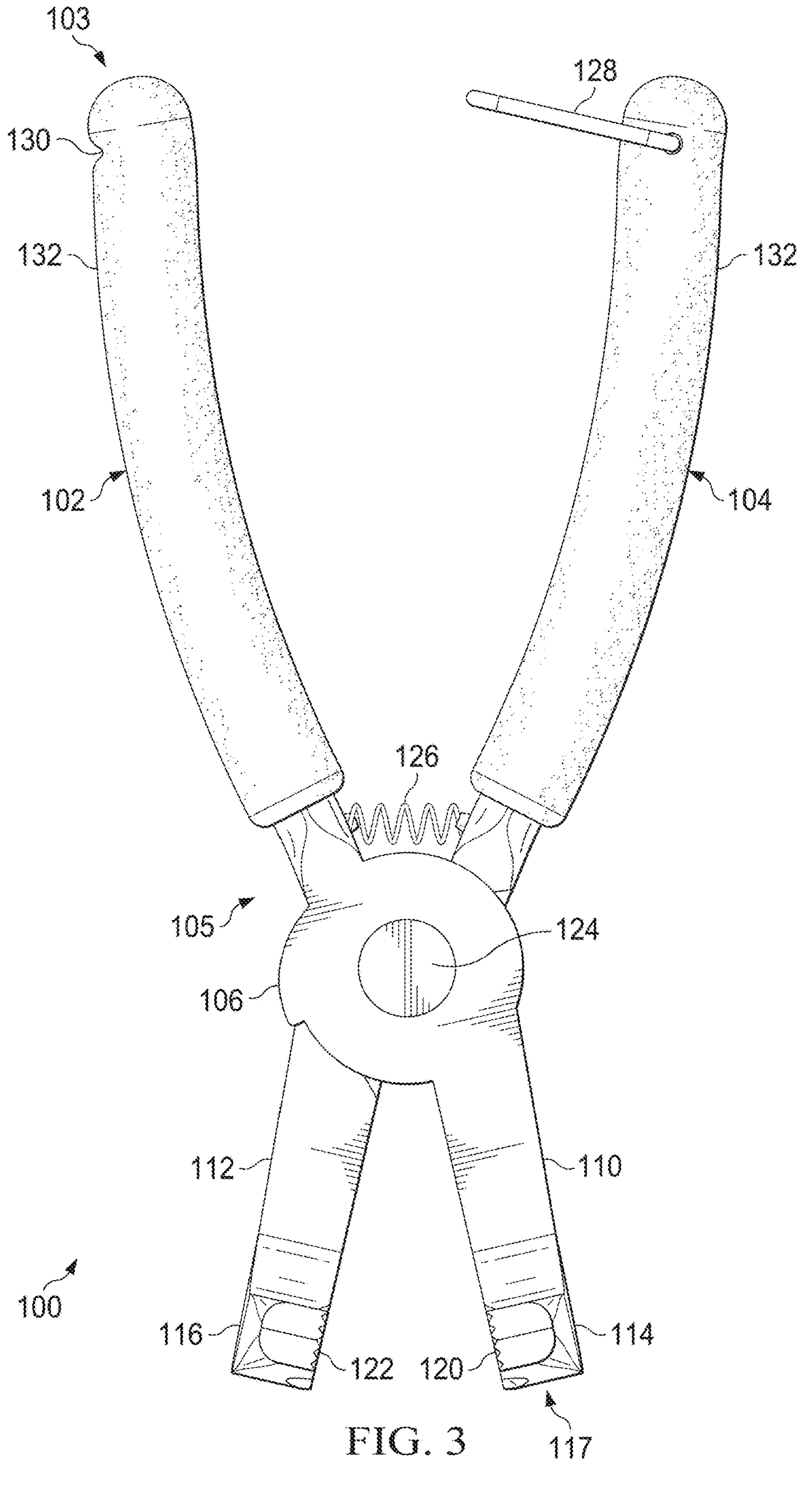
FIG. 3 depicts a bottom view of the bent nose pliers of FIG. 1.
Figure 4:
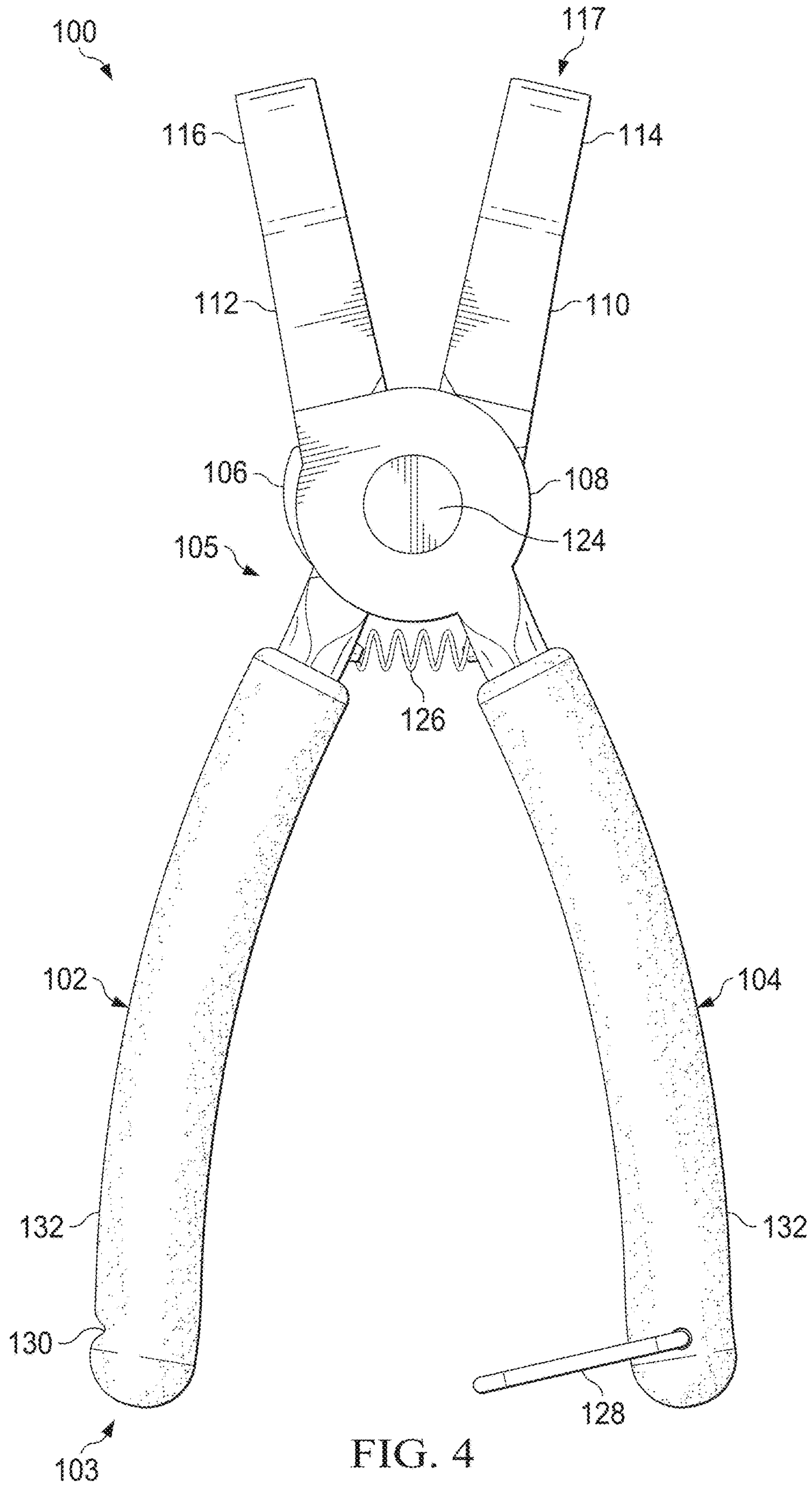
FIG. 4 depicts a top view of the bent nose pliers of FIG. 1.

Turning to FIG. 1, a front perspective view of a first embodiment of bent nose pliers 100 is depicted. The illustrated bent nose pliers (or gripping tool) 100 include a first handle 102 and a second handle 104. The first midsection 106 of the first handle 102 is rotatably connected to the second midsection 108 of the second handle 104 via a rivet 124, allowing the first and second handles 102, 104 to pivot relative to one another. As shown in FIGS. 3 and 4, both the first midsection 106 and the second midsection 108 feature an aperture into which the rivet 124 is inserted. The rivet 124 can be removably installed within the first and second midsections 106, 108 or can be permanently installed. In an alternative embodiment, the first midsection 106 has a rivet 124 that is designed to fit into the aperture of the second midsection 108, enabling the second handle 104 to rotate around the rivet 124. Conversely, the second midsection 108 can have a rivet 124 that is designed to fit into the aperture of the first midsection 106, allowing the first handle 102 to rotate around the rivet 124.

Turning back to FIG. 1, a first jaw 110 is connected to the first (or proximal) end 105 of the first handle 102, while a second jaw 112 is connected to the first (or proximal) end 105 of the second handle 104. In the illustrative embodiment, the first handle 102 and the first jaw 110 are located in a first plane defined by a first axis (or x-axis) 134 and a third axis (or y-axis) 138, where the first handle 102 and the first jaw 110 extend generally along the first axis (or x-axis) 134 when the bent nose pliers 100 are in a closed configuration. The second handle 104 and the second jaw 112 are coplanar and coextensive with the first handle 102 and the first jaw 110 when the bent nose pliers 100 are in the closed configuration. A first nose 114 is attached to the end of the first jaw 110 opposite the first handle 102, and a second nose 116 is attached to the end of the second jaw 112 opposite the second handle 104. The first nose 114 and the second nose 116 are located in a second plane defined by a second axis (or z-axis) 136 and the third axis (or y-axis) 138 or in a plane parallel to the second and third axes 136 and 138, extending along the second axis (or z-axis) 136 or in a direction parallel to the second axis (or z-axis) 136.

As shown in FIG. 1, the first axis (or x-axis) 134 intersects with the second axis (or z-axis) 136, forming an angle (α1) that corresponds to the angle between each of the jaws (e.g., jaws 110 and 112) and its corresponding nose (e.g., noses 114 and 116). The angle (α1) can range between 75° and 105°, and in some embodiments, it may be about 90°. A first cutout 118*a* is formed in the interior portion of the first nose 114 at a first (proximal) end 115, and a first engagement surface 120 is formed at a second (or distal) end 117 of the interior portion of the first nose 114. Similarly, a second cutout 118*b* is formed in the interior portion of the second nose 116 at the first (proximal) end 115, and a second engagement surface 122 is formed at the second (or distal) end 117 of the interior portion of the second nose 116.

Figure 5:
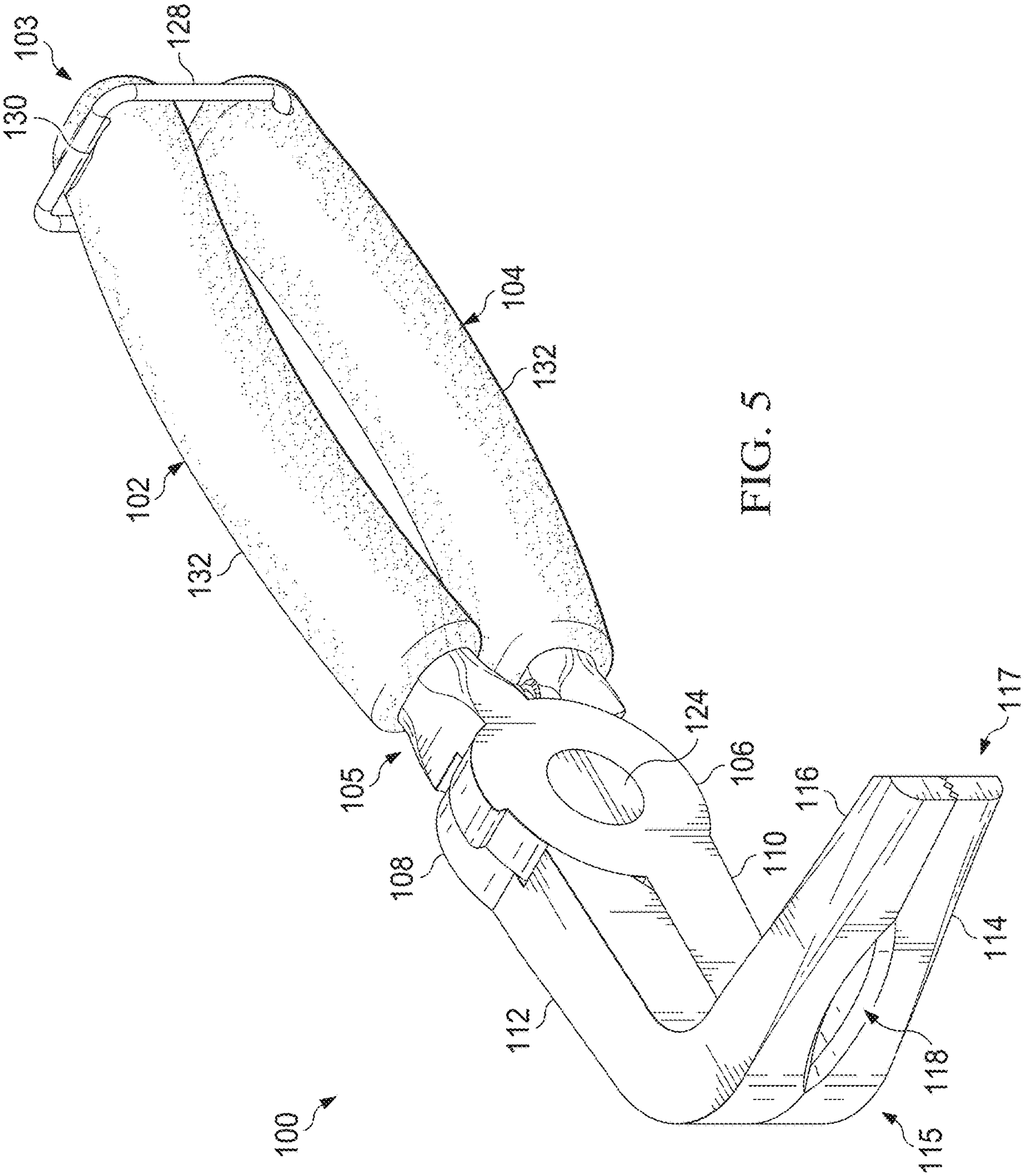
FIG. 5 depicts an alternative perspective view of the bent nose pliers of FIG. 1.

The first and second handles 102, 104 can feature a textured gripping surface 132 designed to enhance engagement and reduce slippage during use. The gripping surface 132 can have a crosshatched, knurled, stippled, ribbed, or wave-like patterns. The gripping surface 132 can comprise a rubberized coating, thermoplastic elastomer (TPE), silicone, or other textured materials. The gripping surface 132 may include contoured finger grooves, a palm swell, or anti-fatigue zones. The gripping surface 132 can have recessed channels to promote moisture drainage and maintain grip integrity in wet or oily conditions. In at least one embodiment, the gripping surface 132 has a series of raised, interlocking ridges arranged in a crosshatch pattern, creating a diamond-shaped texture. Each ridge has a height ranging from approximately 0.5 mm to 1.5 mm and is spaced at regular intervals to optimize tactile feedback and ergonomic comfort. With continued reference to FIG. 1, the first handle 102 has a recess 130 located on the outer portion at the second (or distal) end 103, while a clasp 128 is hingedly connected to the distal end 103 of the second handle 104. As shown in FIG. 5, the clasp 128 is designed to engage the recess 130, securing the gripping tool 100 in a closed configuration.

Figure 2:
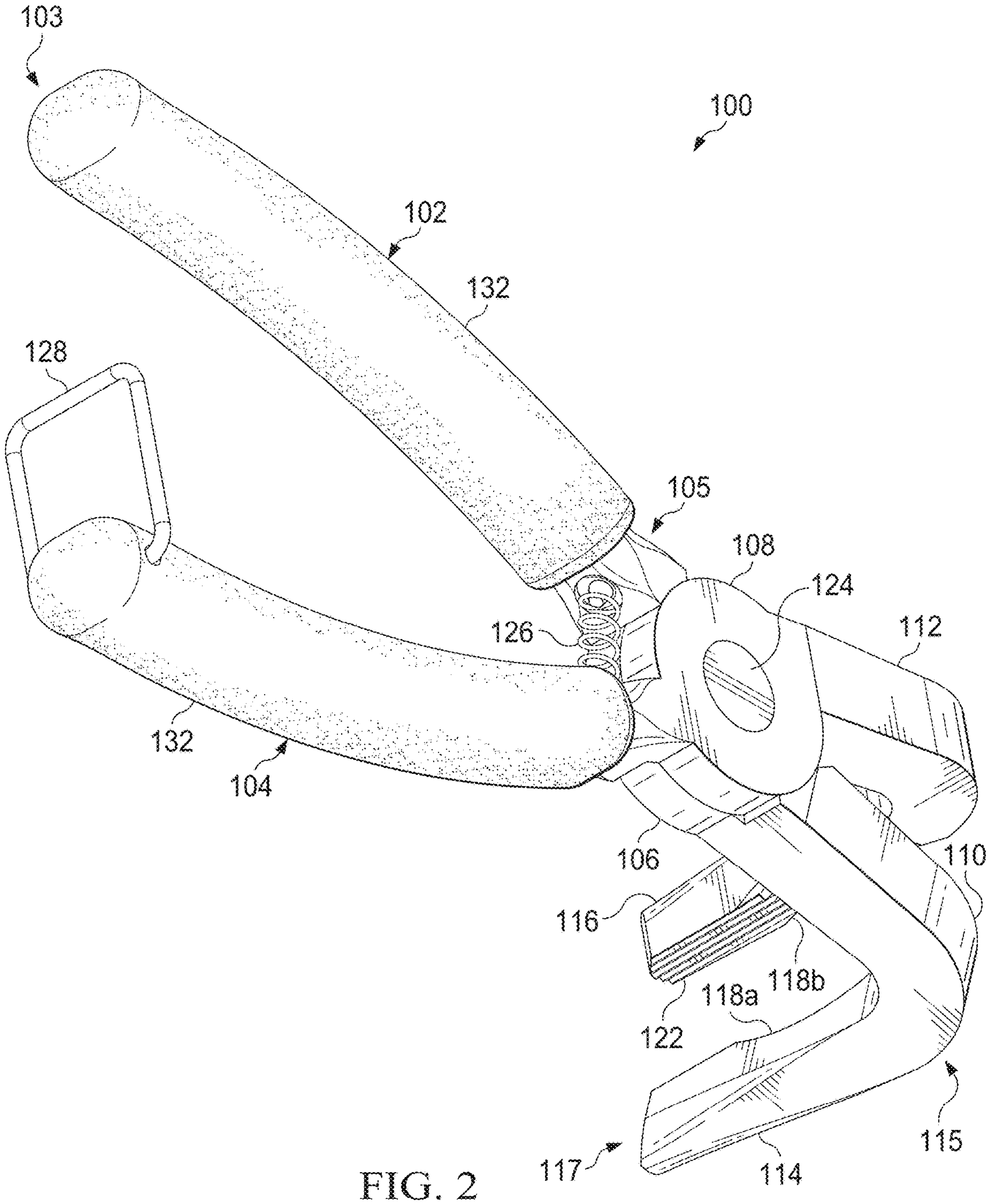
FIG. 2 depicts a rear perspective view of the bent nose pliers of FIG. 1.

Turning to FIG. 2, the gripping tool 100 features a biasing member 126 positioned between the first handle 102 and the second handle 104. The biasing member 126 exerts an outward force that pivots the first and second handles 102, 104 away from each other, placing the gripping tool 100 in an open configuration. This configuration allows a user to selectively position the gripping tool 100 to grasp an object. One advantage of this design is that a user only needs to squeeze the handles 102, 104 to grasp an object, whereas without the biasing member 126, a user would need to adjust the handles' 102, 104 position, complicating the process of positioning the gripping tool 100 for grasping an object. While the illustrative embodiment shows the biasing member 126 as a coiled spring, it can also be a leaf spring, a torsion spring, a rubber pad, a magnetic biasing member, or any combination thereof.

Referring to FIG. 5, an alternative perspective view of the gripping tool 100 in the closed configuration is illustrated. As seen in the illustrative embodiment, the gripping tool 100 is in the closed configuration when the biasing member (not illustrated) is compressed. In this closed configuration, the first and second noses 110, 112 engage each other, and the first and second cutouts 118*a*, 118*b* create an opening 118. This opening 118 enables a user to grasp an object within it. A key advantage of this configuration is that the opening 118 provides users with a better grip on cylindrical or rounded objects. For instance, opening 118 can cradle wires, rods, or small tubes, ensuring a more secure grip without slipping. This configuration is particularly useful in electronics, jewelry making, or precision mechanical work. Moreover, opening 118 minimizes surface contact to prevent marring or damaging delicate components. The first and second cutouts 118*a*, 118*b* can also serve as grooves to assist in bending or looping wire into consistent shapes (e.g., in crafting or electrical work). Furthermore, the first and second cutouts 118*a*, 118*b* can advantageously reduce the overall weight of the tool, balancing the pliers ergonomically.

Figure 6:
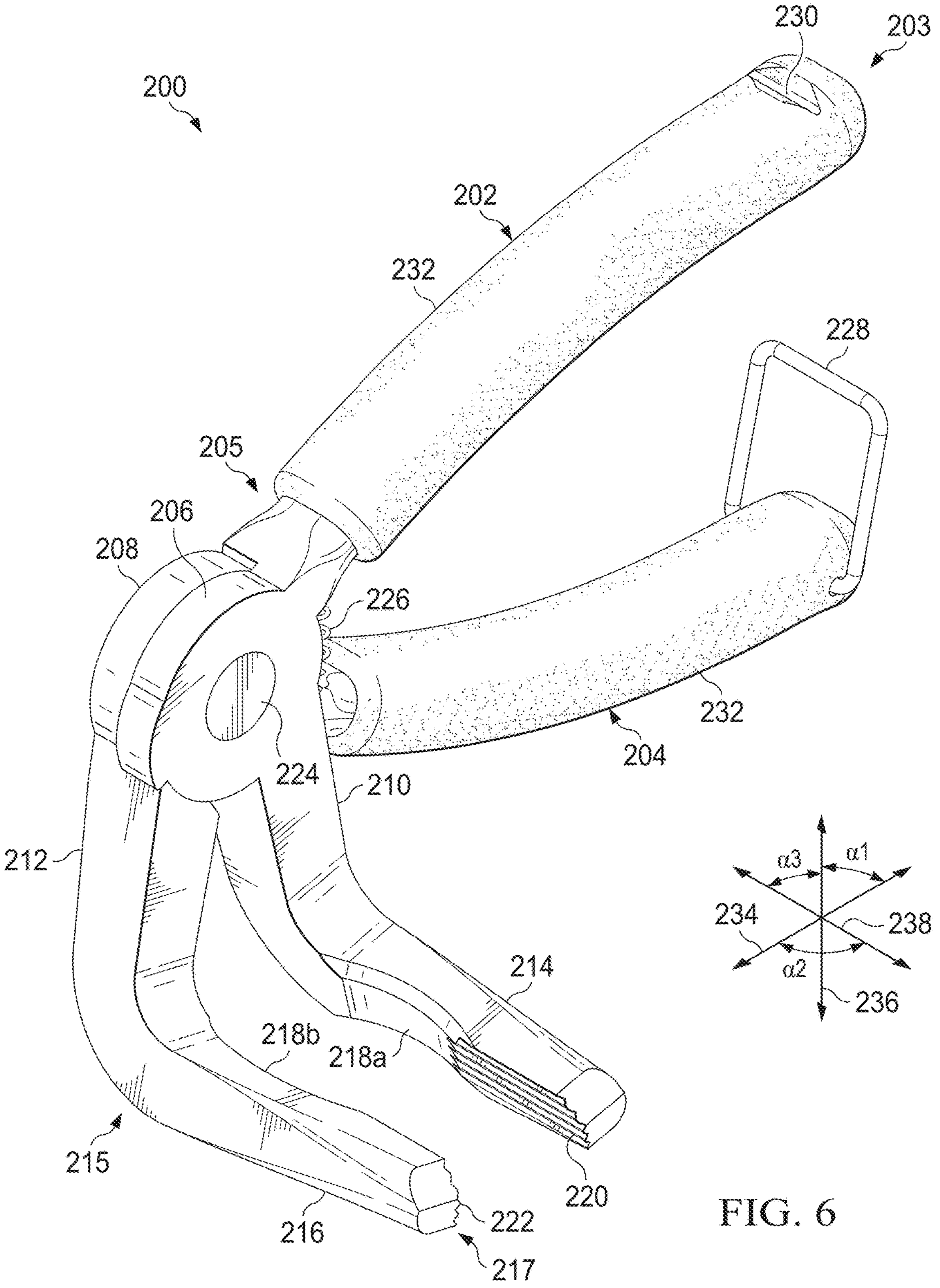
FIG. 6 depicts a front perspective view of a second embodiment of bent nose pliers in accordance with the disclosed principles.
Figure 8:
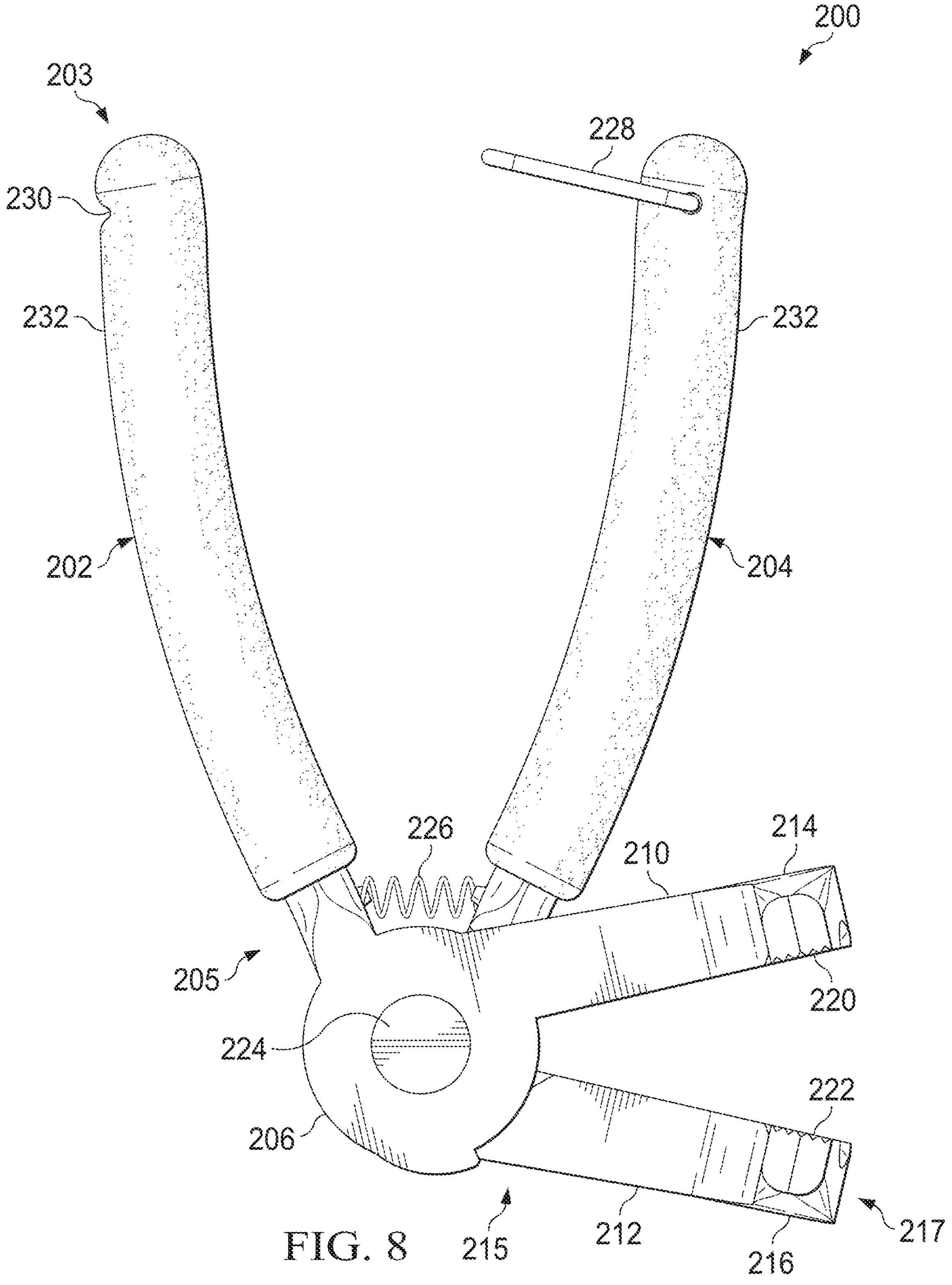
FIG. 8 depicts a bottom view of the bent nose pliers of FIG. 6.
Figure 9:
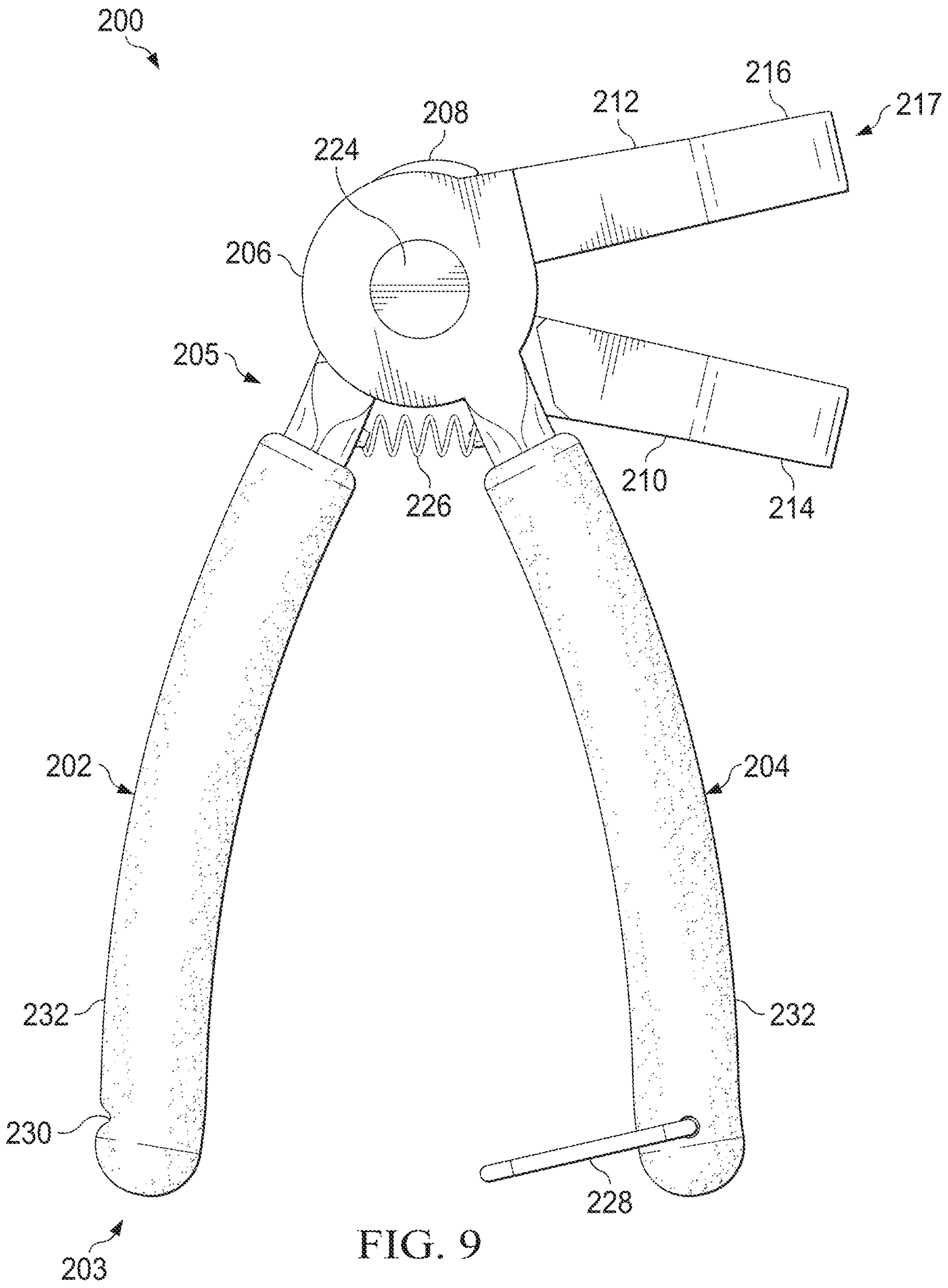
FIG. 9 depicts a top view of the bent nose pliers of FIG. 6.

Turning to FIG. 6, a front perspective view of a second embodiment of bent nose pliers (or gripping tool) 200 in accordance with the disclosed principles is illustrated. Like other embodiments disclosed herein, the gripping tool 200 includes a first handle 202 and a second handle 204. The first midsection 206 of the first handle 202 is rotatably connected to the second midsection 208 of the second handle 204 via a rivet 224, enabling the first and second handles 202, 104 to pivot relative to each other. As seen in FIGS. 8 and 9, the first midsection 206 and the second midsection 208 each have an aperture through which the rivet 224 is inserted. The rivet 224 can be removably installed within the first and second midsections 206, 208 or can be permanently installed. In an alternative embodiment, the first midsection 206 has a rivet 224 that is designed to be inserted into the aperture of the second midsection 208 so that the second handle 204 rotates about the rivet 224. Alternatively, the second midsection 208 can have a rivet 224 that is configured to be inserted into the aperture of the first midsection 206 so that the first handle 202 rotates around the rivet 224.

Turning back to FIG. 6, a first jaw 210 is connected to the first (or proximal) end 205 of the first handle 202, and a second jaw 212 is connected to the first (or proximal) end 205 of the second handle 204. A first nose 214 is connected to the end of the first jaw 210 that is opposite the first handle 202, and a second nose 216 is connected to the end of the second jaw 212 that is opposite the second handle 204. The first handle 202 and the first jaw 210 are located in a first plane defined by a first axis (or x-axis) 234 and a second axis (or y-axis) 236. In a closed configuration, the first handle 202 extends generally along the first axis (or x-axis) 234 and the first jaw 210 extends generally in a direction parallel to the second axis 234. The second handle 204 and the second jaw 212 are coplanar and co-extensive with the first handle 202 and the first jaw 210. A first nose 214 is attached to the end of the first jaw 210 opposite the first handle 202, and a second nose 216 is attached to the end of the second jaw 212 opposite the second handle 204. The first nose 214 and the second nose 216 are located in a second plane that is parallel to the first axis (or x-axis) 234 and a third axis (or z-axis) 238. The first and second noses 214, 216 extend in a direction generally parallel to the third axis (or z-axis) 238.

As depicted in FIG. 6, the first axis (or x-axis) 234 intersects the second axis (or y-axis) 236 and the third axis (or z-axis) 238, forming a first angle (α1) and a second angle (α2), respectively. Additionally, the second axis (or y-axis) 236 intersects the third axis (or z-axis) 238, creating a third angle (α3). Each angle (α1, α2, α3) can range from 75° to 105°. In some embodiments, one or more of the first angle (α1), the second angle (α2), or the third angle (α3) can be about 90°. A first cutout 218*a* is formed in the interior portion of the first nose 214 at a first (proximal) end 215, and a first engagement surface 220 is formed at a second (or distal) end 217 of the interior portion of the first nose 214. Similarly, a second cutout 218*b* is formed in the interior portion of the first nose 214 at the first (proximal) end 215, and a second engagement surface 222 is formed at the second (or distal) end 217 of the interior portion of the second nose 216.

Figure 10:
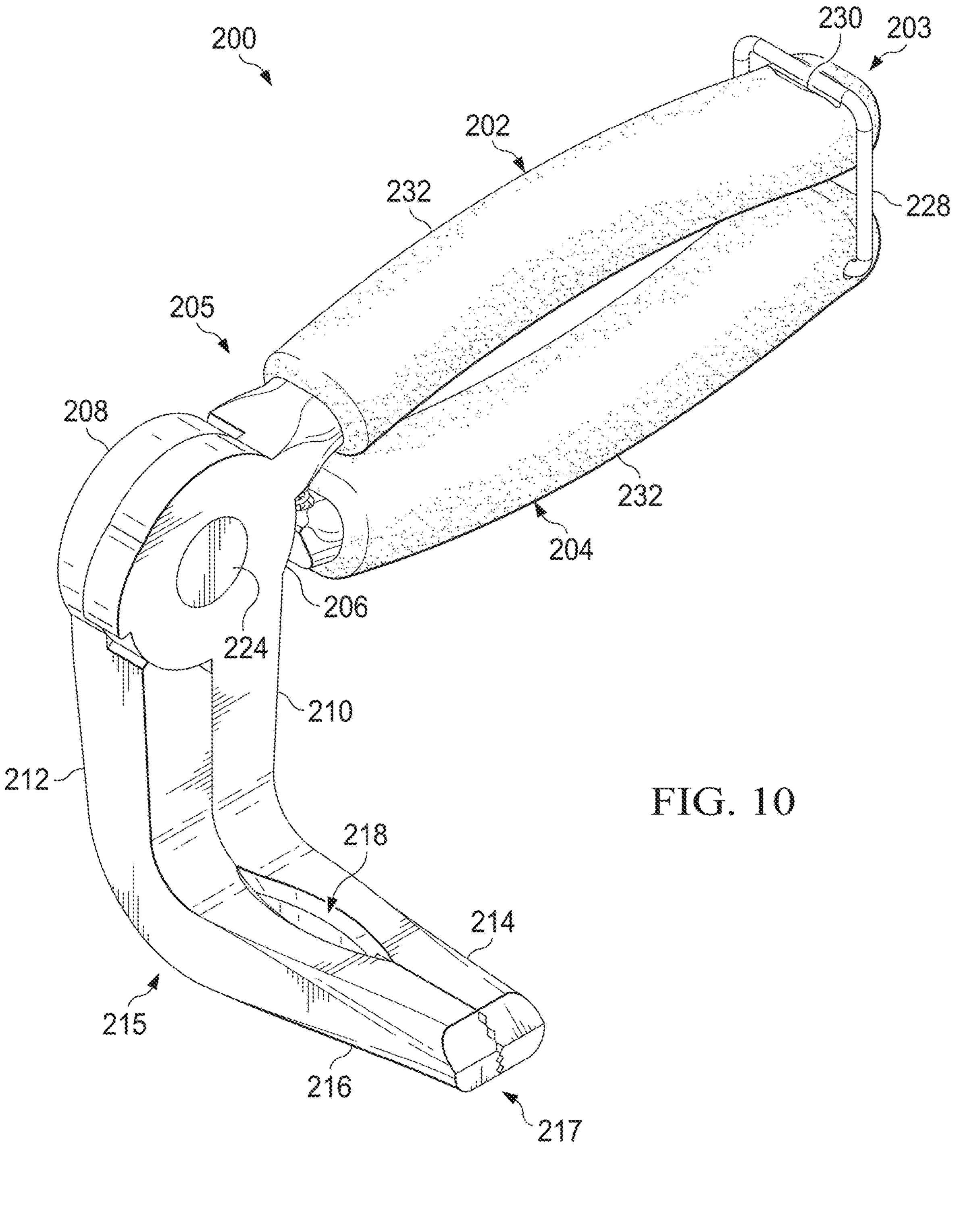
FIG. 10 depicts an alternative perspective view of the bent nose pliers of FIG. 6.

Consistent with the previous embodiments described above, the first and second handles 202, 204 can feature a textured gripping surface 232 designed to enhance engagement and minimize slippage during use. This gripping surface 232 can have a crosshatched, knurled, stippled, ribbed, or wave-like pattern. The gripping surface 232 can comprise a rubberized coating, thermoplastic elastomer (TPE), silicone, or another textured material. Additionally, the gripping surface 232 can incorporate contoured finger grooves, a palm swell, or anti-fatigue zones. The gripping surface 232 can have recessed channels to facilitate moisture drainage and uphold grip integrity in wet or oily conditions. In at least one embodiment, the gripping surface 232 features a series of raised, interlocking ridges arranged in a crosshatch pattern, forming a diamond-shaped texture. Each ridge ranges in height from approximately 0.5 mm to 1.5 mm and is spaced at regular intervals to optimize tactile feedback and ergonomic comfort. The first handle 202 has a recess 230 formed on its outer portion at the second (or distal) end 203, while a clasp 228 is hingedly connected to the distal end 203 of the second handle 204. As shown in FIG. 10, the clasp 228 is designed to engage the recess 230, securing the gripping tool 200 in a closed configuration.

Figure 7:
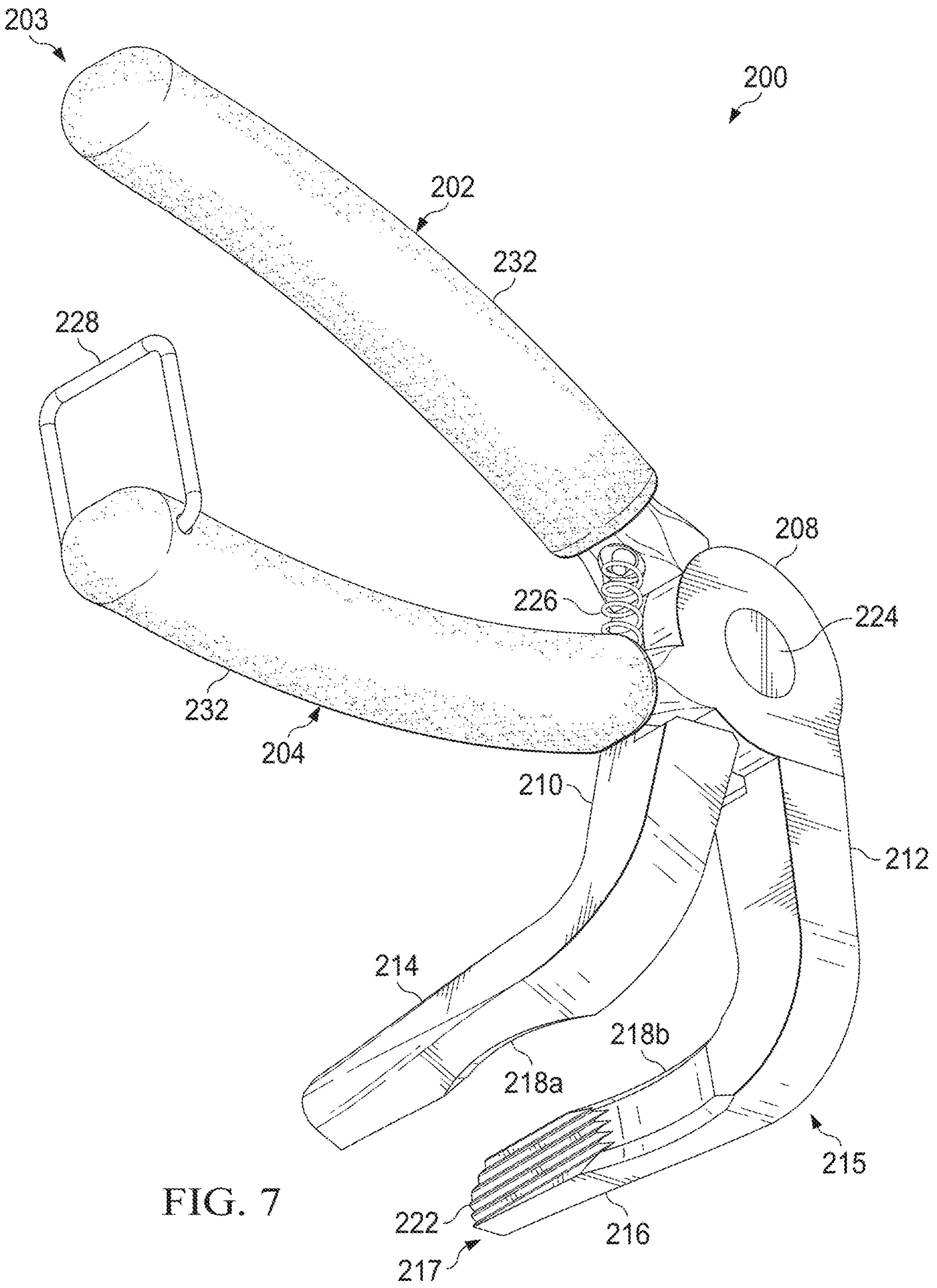
FIG. 7 depicts a rear perspective view of the bent nose pliers of FIG. 6.

Turning to FIG. 7, a rear perspective view of the gripping tool 200 is illustrated. The gripping tool 200 includes a biasing member 226 interconnected between the first handle 202 and the second handle 204. The biasing member 226 exerts an outward force that pivots the first and second handles 202, 204 away from one another, placing the gripping tool 200 in an open configuration. This configuration enables a user to position the gripping tool 200 in a position to grasp an object. An advantage of this configuration is that a user only needs to squeeze the handles 202, 204 to grasp an object, whereas a user would need to manipulate the position of the handles 202, 204 without the biasing member, making it more difficult to position the gripping tool 200 for grasping an object. Although the illustrative embodiment depicts the biasing member 226 as a coiled spring, the biasing member can be a leaf spring, a torsion spring, a rubber pad, a magnetic biasing member, or any combination thereof.

With reference to FIG. 10, an alternative perspective view of the gripping tool 200 in the closed configuration is illustrated. When the biasing member (not illustrated) is compressed, the first and second noses 210, 212 engage each other, and the first and second cutouts 218*a*, 218*b* create an opening 218. As explained in the previously described embodiments, the opening 218 allows a user to grasp an object within it, including providing better grips on cylindrical or rounded objects. The gripping tool 200 is able to provide the same functionality and benefit as the previously described embodiments (e.g., FIGS. 1-5). Additionally, the orientation of the first and second noses 214, 216 relative to the first and second handles 202, 204 provides for better grasping and pulling of objects.

Figure 11A:
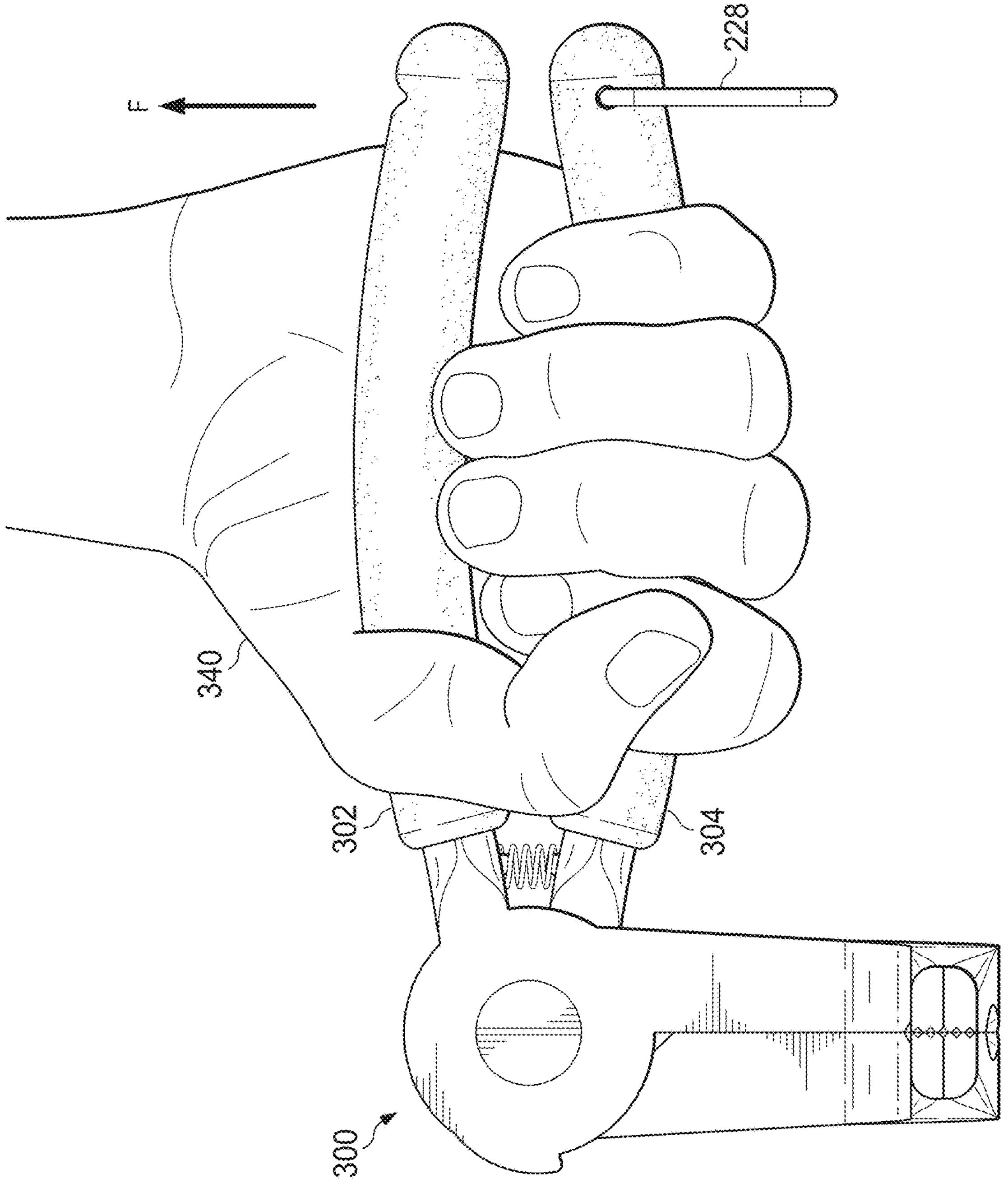
FIG. 11A depicts the orientation of a user's hand holding the bent nose pliers of FIG. 6.
Figure 11B:
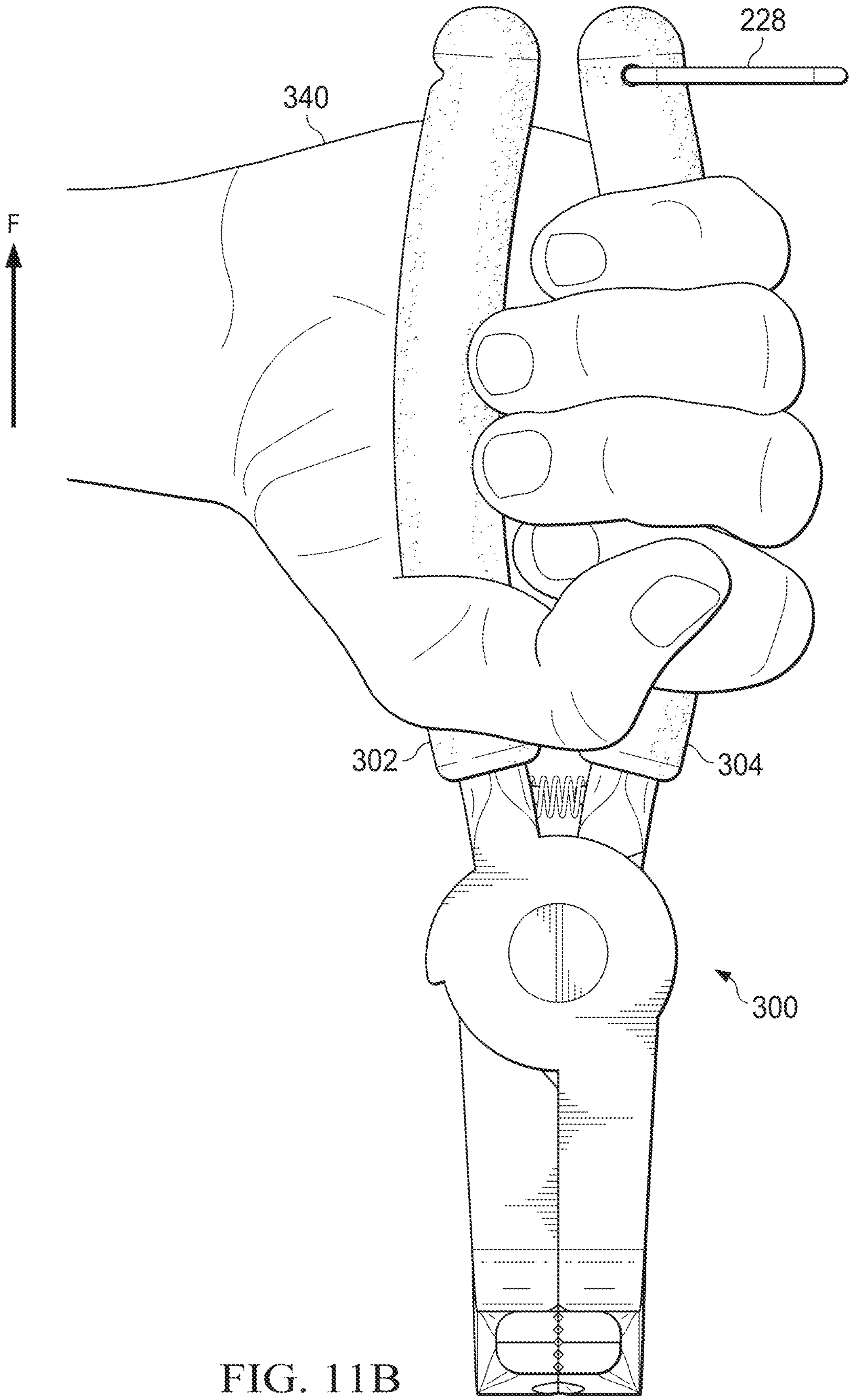
FIG. 11B depicts the orientation of a user's hand holding the bent nose pliers of FIG. 1.

Turning to FIGS. 11A and 11B, illustrations of different gripping orientations are shown. In FIG. 11A, a user's hand 340 grips the handles 302, 304 of the gripping device 300 embodiment depicted in FIGS. 6-10. When the user grasps an object (not illustrated) with the gripping device 300 and applies a pulling force F1, the fingers of the user's hand 340 provide a resisting force on the handles 302 and 304, which increases the pulling force and prevents the gripping tool 300 from slipping out of the user's hand 340. In contrast, as shown in FIG. 11B, a user's hand 340 grips the handles 302, 304 of the gripping device 300 embodiment depicted in FIGS. 1-5. When the user grasps an object (not illustrated) with the gripping device 300 and applies a pulling force F1, there is nothing providing a resisting force on the handles 302 and 304, which increases the likelihood that the gripping tool 300 will slip out of the user's hand 340. Thus, the orientation of the gripping tool shown in FIGS. 6-11A enables a user to utilize the strength of the rest of their arm (and body) instead of focusing on the grip strength required to hold the gripping tool in the orientation shown in FIG. 11B.

As used herein, the term "about" can be understood as the disclosed values varying by 20-25%, 15-20%, 10-15%, 5-10%, 1-5%, or any combination thereof from the listed values.

Additionally, the section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that a particular technology is prior art to any embodiment(s) in this disclosure. Neither is the "Summary" a characterization of the embodiment(s) outlined in issued claims.

Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. A gripping tool comprising:

a first handle extending generally along a first axis when the gripping tool is in a fully closed configuration;

a first jaw connected to the first handle;

a first nose connected to an end of the first jaw, wherein:

the first nose extends in a direction parallel to a second axis, the first nose comprises a first curved cutout formed through a first interior portion of the first nose, perpendicular to the second axis, and having a first depth between crest and trough, the first nose comprises a plurality of grooves that are parallel to the second axis, form teeth in a second interior portion of the first nose, and have a second depth between crest and trough, and the first depth is greater than the second depth;

a second handle extending generally along the first axis when the gripping tool is in the fully closed configuration, wherein the second handle is rotatably connected with the first handle such that the first and second handles are configured to pivot relative to each other;

a second jaw connected to the second handle;

a second nose connected to an end of the second jaw, wherein:

the second nose extends in a direction parallel to the second axis, the second nose comprises a second curved cutout formed through a first interior portion of the second nose, perpendicular to the second axis, and having the first depth, and the second nose comprises a plurality of grooves that are parallel to the second axis, form teeth in a second interior portion of the second nose, and have the second depth; and a biasing member interconnected between the first handle and the second handle, wherein:

the biasing member exerts an outward force on the first and second handles to place the gripping tool in an open configuration, when the gripping tool is in the fully closed configuration, the biasing member is compressed and the second interior portion of the first nose directly touches the second interior portion of the second nose, and the first curved cutout and the second curved cutout form an opening between the first nose and the second nose when the gripping tool is in the fully closed configuration.

2. The gripping tool of claim 1, wherein the first jaw and the second jaw extend along the first axis, and wherein an angle between each of the handles and their corresponding nose is between 75° and 105°.

3. The gripping tool of claim 2, wherein the angle is about 90°.

4. The gripping tool of claim 1, wherein the first jaw and the second jaw extend along a third axis, wherein a first angle between each of the handles and their corresponding nose is between 75° and 105°, wherein a second angle between each of the handles and their corresponding jaw is between 75° and 105°, and wherein a third angle between each jaw and their corresponding nose is between 75° and 105°.

5. The gripping tool of claim 4, wherein each angle is about 90°.

6. The gripping tool of claim 1, wherein the second interior portions are at distal ends of the first and second noses, and wherein the first interior portions are at proximal ends of the first and second noses.

7. The gripping tool of claim 1, wherein the first handle comprises a recess at a distal end, wherein the second handle comprises a clasp at a distal end, and wherein the clasp is configured to engage the recess and compress the biasing member such that the gripping tool is in the fully closed configuration.

8. The gripping tool of claim 1, further comprising a rivet, wherein a first midsection of the first handle has a first aperture, a second midsection of the second handle has a second aperture, and wherein the rivet is inserted within the first and second apertures such that the first and second handles rotate about the rivet.

9. The gripping tool of claim 1, wherein a first midsection of the first handle comprises a rivet extending in a direction generally along the second axis, wherein a second midsection of the second handle comprises an aperture, and wherein the rivet is inserted within the aperture such that the second handle rotates about the rivet.

10. The gripping tool of claim 1, wherein the biasing member is a coil spring, a leaf spring, a torsion spring, a rubber pad, or a magnetic biasing member.

11. The gripping tool of claim 1, wherein:

the first curved cutout has a top region, a bottom region, and a center region;

the second curved cutout has a top region, a bottom region, and a center region;

the top region and the bottom region of the first curved cutout and the second curved cutout have a greater average depth than the center region of the first curved cutout and the second curved cutout;

the center region of the first curved cutout and the second curved cutout has uniform thickness and a width of at least two teeth; and the top region and the bottom region of the first curved cutout and the second curved cutout do not have uniform thickness.

12. A gripping tool comprising:

a first handle extending generally along a first axis when the gripping tool is in a fully closed configuration;

a first jaw connected to the first handle, wherein the first jaw extends in a direction generally parallel to a second axis;

a first nose connected to an end of the first jaw, wherein;

the first nose extends in a direction generally parallel to a third axis, the first nose comprises a first curved cutout formed through a first interior portion of the first nose, perpendicular to the third axis, and having a first depth between crest and trough, the first nose comprises a plurality of grooves that are parallel to the third axis, form teeth in a second interior portion of the first nose, and have a second depth between crest and trough, and the first depth is greater than the second depth;

a second handle extending generally along the first axis when the gripping tool is in the fully closed configuration, wherein the second handle is rotatably connected with the first handle such that the first and second handles are configured to pivot relative to each other;

a second jaw connected to the second handle, wherein the second jaw extends in a direction generally parallel to the second axis;

a second nose connected to an end of the second jaw, wherein:

the second nose extends in a direction generally parallel to the third axis, the second nose comprises a second curved cutout formed in an interior portion of the second nose, perpendicular to the third axis, and having the first depth, and the second nose comprises a plurality of grooves that are parallel to the third axis, form teeth in a second interior portion of the second nose, and have the second depth; and a biasing member interconnected between the first handle and the second handle, wherein:

the biasing member exerts an outward force to place the gripping tool in an open configuration, when the gripping tool is in the fully closed configuration, the biasing member is compressed and the second interior portion of the first nose directly touches the second interior portion of the second nose, and the first curved cutout and the second curved cutout form an opening between the first nose and the second nose when the gripping tool is in the fully closed configuration.

13. The gripping tool of claim 12, wherein a first angle between each handle and its corresponding jaw is between 75° and 105°, wherein a second angle between each handle and its corresponding nose is between 75° and 105°, and wherein a third angle between each jaw and its corresponding nose is between 75° and 105°.

14. The gripping tool of claim 13, wherein each angle is about 90°.

15. The gripping tool of claim 12, wherein the second interior portions are at distal ends of the first and second noses, and wherein the first interior portions are at proximal ends of the first and second noses.

16. The gripping tool of claim 12, wherein the first handle comprises a recess at a distal end, wherein the second handle comprises a clasp at a distal end, and wherein the clasp is configured to engage the recess such that the gripping tool is in the fully closed configuration.

17. The gripping tool of claim 12, further comprising a rivet, wherein a first midsection of the first handle has a first aperture, a second midsection of the second handle has a second aperture, and wherein the rivet is inserted through the first and second apertures such that the first and second handles rotate about the rivet.

18. The gripping tool of claim 12, wherein a first midsection of the first handle comprises a rivet extending in a direction generally along the third axis, wherein a second midsection of the second handle comprises an aperture, and wherein the rivet is inserted through the aperture such that the second handle rotates about the rivet.

19. The gripping tool of claim 12, wherein the first axis, the second axis, and the third axis are not parallel to one another.

20. The gripping tool of claim 12, wherein the the first curved cutout has a top region, a bottom region, and a center region;

the second curved cutout has a top region, a bottom region, and a center region;

the top region and the bottom region of the first curved cutout and the second curved cutout have a greater average depth than the center region of the first curved cutout and the second curved cutout;

the center region of the first curved cutout and the second curved cutout has uniform thickness and a width of at least two teeth; and the top region and the bottom region of the first curved cutout and the second curved cutout do not have uniform thickness.

* * * * *